(12) United States Patent
VanBlon et al.

(10) Patent No.: US 10,613,609 B2
(45) Date of Patent: Apr. 7, 2020

(54) BATTERY POWERED DEVICE POWER SAVING ACTIONS RESPONSIVE TO POWER LOSS EVENT

(71) Applicant: Lenovo (Singapore) Pte. Ltd., Singapore (SG)

(72) Inventors: Russell S. VanBlon, Raleigh, NC (US); Robert J. Kapinos, Durham, NC (US); Timothy W. Kingsbury, Cary, NC (US); Scott W. Li, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 104 days.

(21) Appl. No.: 15/881,736

(22) Filed: Jan. 27, 2018

(65) Prior Publication Data

US 2019/0235604 A1    Aug. 1, 2019

(51) Int. Cl.
| | | |
|---|---|---|
| *G06F 1/32* | (2019.01) | |
| *G06F 1/3234* | (2019.01) | |
| *G06F 1/329* | (2019.01) | |
| *G06F 1/3206* | (2019.01) | |
| *G06F 1/30* | (2006.01) | |

(52) U.S. Cl.
CPC .............. *G06F 1/3234* (2013.01); *G06F 1/30* (2013.01); *G06F 1/3206* (2013.01); *G06F 1/329* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 2007/0057767 A1* | 3/2007 | Sun ........................ | G06F 1/3228 340/7.35 |
| 2016/0209907 A1* | 7/2016 | Han ....................... | G06F 1/3209 |
| 2018/0338032 A1* | 11/2018 | Baek ....................... | H04L 67/22 |

* cited by examiner

*Primary Examiner* — Zahid Choudhury

(74) *Attorney, Agent, or Firm* — VanLeeuwen & VanLeeuwen; Jason A. Friday

(57) ABSTRACT

An approach is provided for identifying power loss events. The approach further performs power saving actions at a battery powered device that are responsive to the identified power loss event.

20 Claims, 8 Drawing Sheets

BATTERY POWERED DEVICE POWER SAVING ACTIONS RESPONSIVE TO POWER LOSS EVENT

BACKGROUND

When a power loss occurs, an uncharged mobile device provides no means of communication with friends, family, news updates, or emergency services. When a storm or other power loss event occurs, users want their mobile devices to last as long as possible. The user needs to make sure to charge their devices beforehand, and they should conserve battery power when using such devices during the outage, especially when the duration of the outage is uncertain. The user can us backup batteries or standby generators, however these options require additional investment by the user.

SUMMARY

An approach is provided for identifying power loss events. The approach further performs power saving actions at a battery powered device that are responsive to the identified power loss event.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
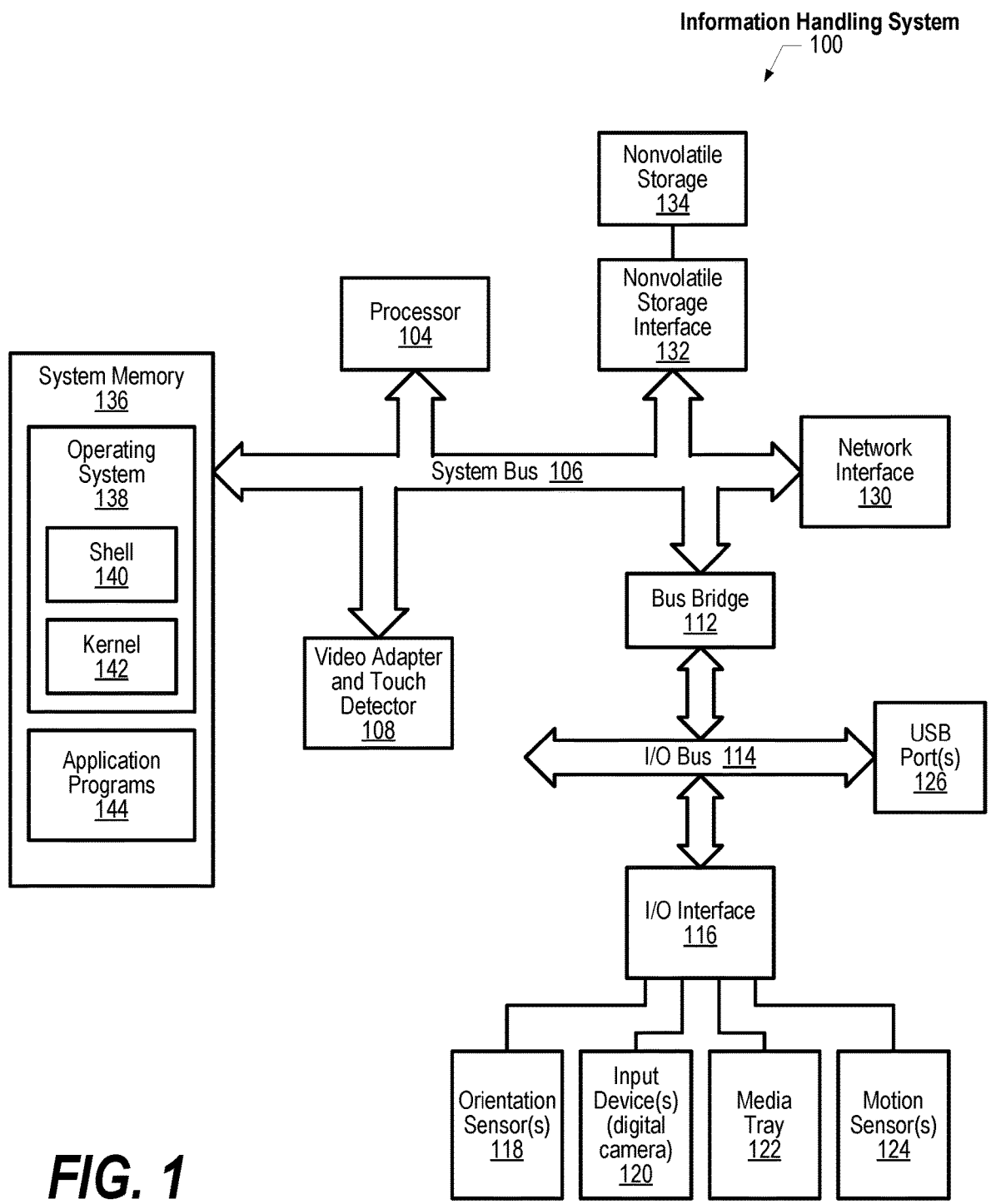
FIG. 1 depicts a block diagram of a processor and components of an information handling system.

FIGS. 1-8 show an approach for power reserve based on predicted power outage. Services installed in the mobile device gather weather forecast data from weather data provider(s) and, accordingly, analyze characteristics pertaining to a predicted power outage. These characteristics include the type of possible predicted power outage (e.g. heavy snow fall, flood, typhoon, severe thunderstorms, etc), the degree, or extent, of the predicted power outage, the predicted impacted zone of the power outage, and the predicted time ranges that the power outage is expected to last.

This approach detects when a power loss has occurred or will occur. Upcoming weather is analyzed for ice storms, hurricanes, etc. This could also be done after the fact by looking for routers or other powered devices that are normally accessible but are no longer powered on at a particular location, or by querying power companies for status of that address (available online in many areas). This information could then be shared to a cloud account or other nearby devices at the location. If a potential power loss event is known in advance (possibly by analyzing past weather events and power outages), the user can be prompted to charge mobile devices that are below a charge threshold so that such devices are charged before the power loss event occurs.

Once a power loss occurs (or is expected to occur), the device can then change the power mode to disable certain apps, built-in hardware, hardware peripherals, wireless radios, background services, CPU throttling, screen brightness, etc in order to preserve as much power as possible during the power outage. This could prevent games or videos from being launched that would consume power for non-vital activities. For example, if a child attempts to use a device, a parental device could be used to approve access to execute certain apps in this example, or even prevent usage of the device in case certain devices may be needed for m ore important tasks.

Notifications could be delivered to the user explaining why a device is running slower than normal or with a dimmer screen in order to conserve battery life, why certain apps are not accessible, etc. These messages could be provided leading up to the power outage event or during the power outage to make users aware of a change in normal operation of the device.

Another scenario is where the user is at one location (such as an office) and the power outage event is at the location to which the user is traveling (such as the user's home). The user could be warned in advanced to charge up the user's device before leaving work.

Services installed in mobile device search for historical data pertaining to natural calamities in the predicted zone for the predicted type of power outage. The approach calculates the total power requirement expected during the power outage and the predicted next possible recharge time.

The approach alerts the user of the mobile device of the predicted power outage and suggests that the user terminate some of the services running on the device. In addition, the approach also provides a means for the mobile device to automatically terminate services without user intervention. In addition, if the mobile device does not have enough power to last through the predicted power outage, then the device will alert the user that the device should be charged before the power outage occurs at which time electrical power may be lost during the course of the power outage.

Software installed in mobile device will start services based on upcoming disaster event. Services can start immediately before, during, or after the event. An example would be a homing beacon that wakes the mobile device and sends location information (and schedules a time when the next location ping will be sent) on a given time interval. The approach can let family members know you are in a danger zone and that your phone is still alive (can even require you to type a confirmation you are physically well when it is scheduled to send the message). The approach can then continue to send beacons on a time interval basis so that your family or emergency personnel can find you if you are injured or unconscious after the event until such functionality is disabled (which would send an "all clear" message to your family).

The approach described herein may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention.

FIG. 1 illustrates information handling system 100, which is a simplified example of a computer system capable of performing the computing operations described herein. Note that some or all of the exemplary architecture, including both depicted hardware and software, shown for and within information handling system 100 may be utilized by a software deploying server.

Information handling system 100 includes processor 104 that is coupled to system bus 106. Processor 104 may utilize one or more processors, each of which has one or more processor cores. Video adapter 108, which drives/supports touch screen display 110, is also coupled to system bus 106. System bus 106 is coupled via bus bridge 112 to input/output (I/O) bus 114. I/O interface 116 is coupled to I/O bus 114. I/O interface 116 affords communication with various I/O devices, including orientation sensor 118, input device(s) 120, media tray 122 (which may include additional storage devices such as CD-ROM drives, multi-media interfaces, etc.), motion sensor 124, and external USB port(s) 126. Input devices 120 may include keyboards, mice, trackpads/trackballs, and other devices that provide input to the system through I/O interface 116.

The hardware elements depicted in information handling system 100 are not intended to be exhaustive, but rather are representative to highlight essential components required by the present invention. For instance, information handling system 100 may include alternate memory storage devices such as magnetic cassettes, digital versatile disks (DVDs), Bernoulli cartridges, and the like. These and other variations are intended to be within the spirit and scope of the present invention.

Figure 2:
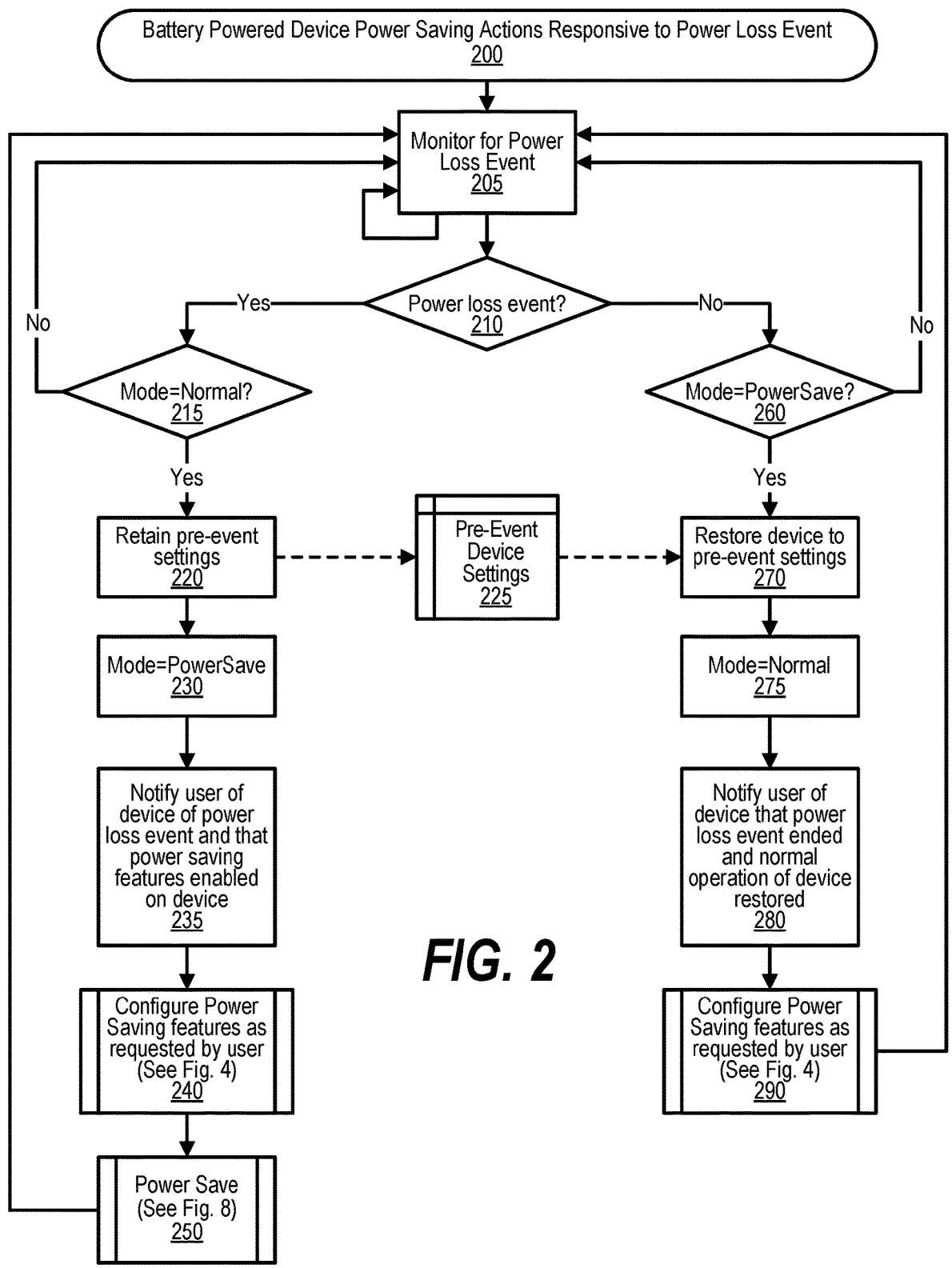
FIG. 2 is a high level flowchart diagram depicting steps taken by a battery powered device's power saving actions that are responsive to a power loss event.

FIG. 2 is a high level flowchart diagram depicting steps taken by a battery powered device's power saving actions that are responsive to a power loss event. FIG. 2 processing commences at 200 and shows the steps taken by a process performed by a battery powered device using power saving actions that are responsive to a power loss event. At step 205, the process monitors for a power loss event. The occurrence of a power loss event might be detected in several ways, such as receiving a message at the device from an external source. The process determines as to whether a power loss event is currently in progress with a power outage being detected (decision 210). If a power loss event is currently in progress, then decision 210 branches to the 'yes' branch to perform steps 215 through 250. On the other hand, if a power loss event is not currently in progress, then decision 210 branches to the 'no' branch to perform steps 260 through 290.

When a power loss event is in progress, the process next determines as to whether the current mode of the device is 'Normal' indicating normal (no power loss) was previously detected at the device (decision 215). If the current mode of the device is 'Normal', then decision 215 branches to the 'yes' branch to perform steps 220 through 250. On the other hand, if the current mode of the device is not 'Normal' (i.e., is already 'PowerSave'), then decision 215 branches to the 'no' branch which loops back to step 205 to continue monitoring for when the power is restored. Steps 220 through 250 are performed when the power loss is first detected.

At step 220, the process retains pre-event settings at the device with these settings, such as screen brightness, etc.

being stored in memory area 225. At step 230, the process sets the mode of the device to 'PowerSave' to indicate that the device has entered the power saving mode. At step 235, the process notifies a user of device of the power loss event and that power saving features have been enabled on device. At predefined process 240, the process performs the Configure Power Saving features as requested by user routine (see FIG. 4 and corresponding text for processing details). Predefined process 250 might only be performed when requested by the user of the device. At predefined process 250, the process performs the Power Save routine (see FIG. 8 and corresponding text for processing details).

Returning to decision 210, if a power loss event is not detected as currently occurring, then decision 210 branches to 'no' branch whereupon, at decision 260, the process determines whether the mode at the device is currently in 'PowerSave' mode, indicating that power has recently been restored after the device has entered power saving mode (decision 260). If the mode at the device is currently in 'PowerSave' mode, then decision 260 branches to the 'yes' branch to perform steps 270 through 290 which restore the device when exiting the PowerSave mode. On the other hand, if the mode at the device is not currently in 'PowerSave' mode (is already in 'Normal' mode), then decision 260 branches to the 'no' branch which loops back to step 205 to continue monitoring for a power loss event. When exiting from a PowerSave mode when power has been restored, steps 270 through 290 are performed.

At step 270, the process restores device to pre-event settings with the pre-device settings being retrieved from memory area 225. At step 275, the process sets the mode of the device back to 'Normal' mode. At step 280, the process notifies the user of device that the power loss event ended and that normal operation of device has been restored. At predefined process 290, the process performs the Configure Power Saving features as requested by user routine (see FIG. 4 and corresponding text for processing details). Predefined process 290 might only be performed when requested by the user of the device.

Nonvolatile storage interface 132 is also coupled to system bus 106. Nonvolatile storage interface 132 interfaces with one or more nonvolatile storage devices 134. In one embodiment, nonvolatile storage device 134 populates system memory 136, which is also coupled to system bus 106. System memory includes a low level of volatile memory. This volatile memory also includes additional higher levels of volatile memory, including cache memory, registers and buffers. Data that populates system memory 136 includes information handling system 100's operating system (OS) 138 and application programs 144. OS 138 includes a shell 140, for providing transparent user access to resources such as application programs 144. As depicted, OS 138 also includes kernel 142, which includes lower levels of functionality for OS 138, including providing essential services required by other parts of OS 138 and application programs 144, including memory management, process and task management, disk management, and mouse and keyboard management.

Figure 3:
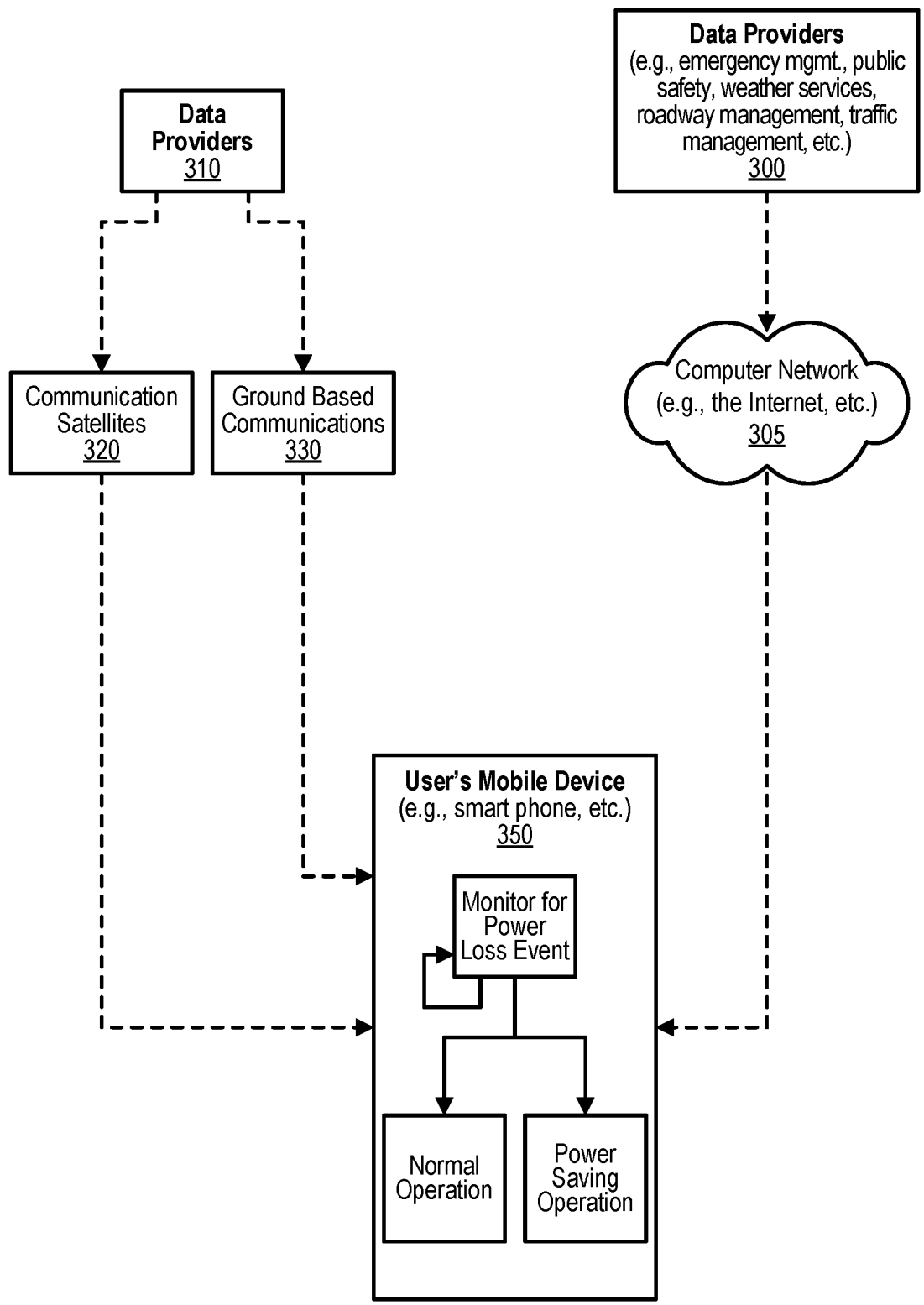
FIG. 3 is a component diagram depicting an exemplary environment providing power reserve based on a predicted power loss event.

FIG. 3 is a component diagram depicting an exemplary environment providing power reserve based on a predicted power outage. Data providers 300, such as emergency management, public safety organizations, weather services, roadway management, traffic management, and the like, provide data pertaining to current and predicted natural calamities such as hurricanes, severe thunderstorms, tornadoes, floods, severe snow storms, and the like. The data prepared by data providers 300 is transmitted through computer network 305, such as the Internet, from which it is eventually received by broadcast providers 310. Broadcast providers 310 include mobile telephone networks, wireless networks, public or government provided wireless information networks, and the like. Broadcast providers 310 utilize a variety of equipment to wirelessly broadcast data pertaining to current and predicted natural calamities to various mobile devices. This equipment includes satellites 320 and communications towers 330, such as a "cell" tower.

Mobile device 350 receives wireless data pertaining to current and predicted natural calamities from broadcast providers 310. As shown in FIGS. 4-7, processes running on the mobile device operate to conserve battery power at the mobile device as well as to instruct the user of the mobile device to fully charge the device in anticipation of the power outage during which traditional electrical power might not be available from the electric power grid that provides electricity to the user's dwelling or business.

Figure 4:
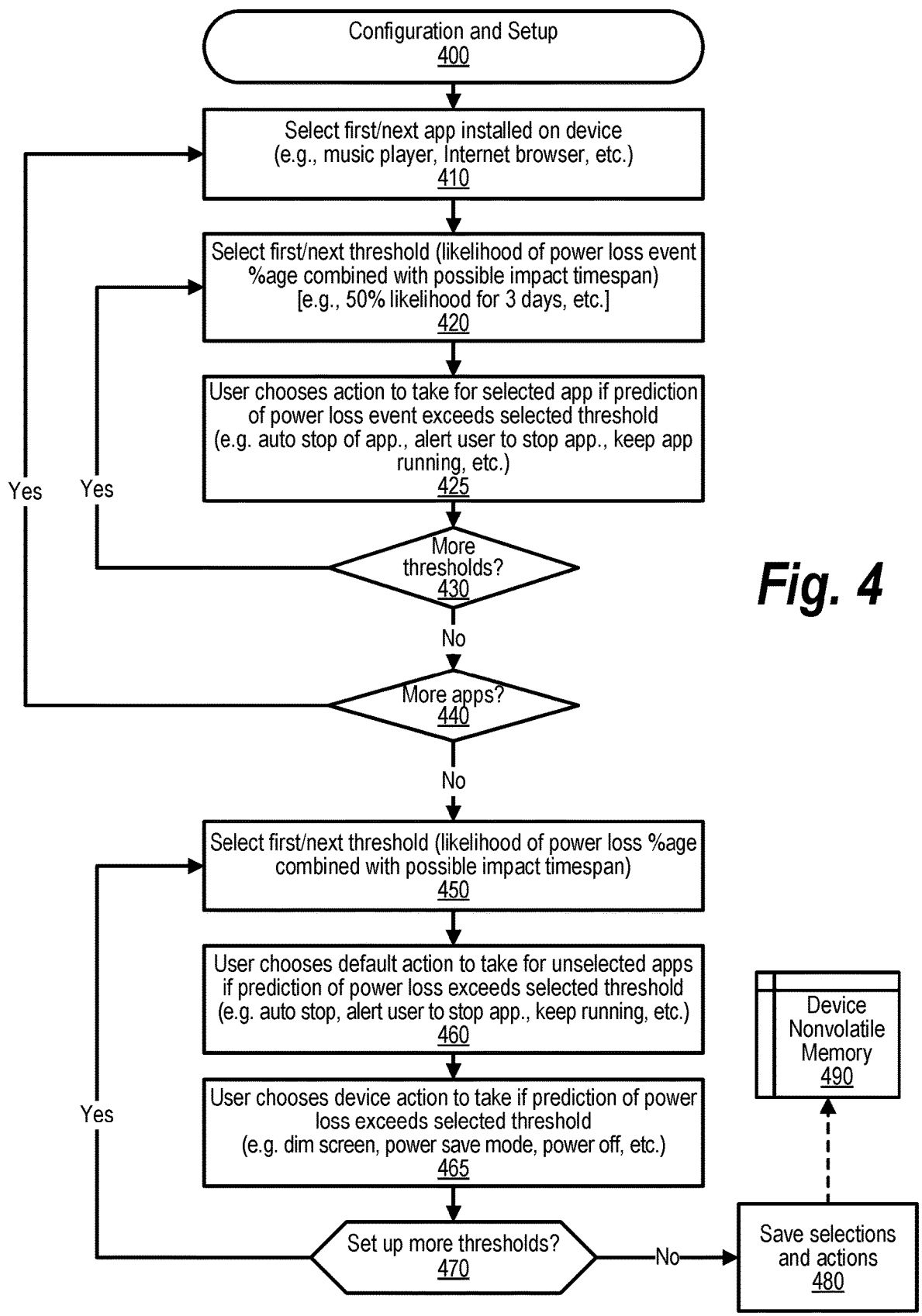
FIG. 4 is a flowchart showing configuration and setup of the system that provides power reserve based on a predicted power loss event.

FIG. 4 is a flowchart showing configuration and setup of the system that provides power reserve based on a predicted power outage. FIG. 4 processing commences at 400 and shows the steps taken by a process that performs configuration and setup of the process that reserves power based on a predicted power outage. At step 410, the process selects the first software application, or "app," installed on device (e.g., music player, Internet browser, etc.).

At step 420, the process selects the first threshold. For example, an impact can be computed as the likelihood of the power outage occurring in the user's geographic area combined with the possible impact time span, such as number of hours or days the impact is likely to last. Using this impact example, the user might select a threshold of a fifty percent (50%) likelihood that the power outage lasts for 3 days, etc. At step 425, the user chooses an action to take for the selected app when a power outage prediction values exceed the thresholds selected by the user. For example, the user may choose to automatically terminate the app, alert the user to terminate the app, or keep the app running. Non-essential apps, such as a music player, may be identified as apps to automatically close, while apps that are potentially helpful during a power outage, such as an emergency broadcast or weather app, may be identified as apps to continue running during the power outage.

The process determines as to whether the user wishes to set up additional thresholds (decision 430). If the user wishes to set up additional thresholds, then decision 430 branches to the 'yes' branch which loops back to step 420 to select the next threshold. This looping continues until the user does not wish to set up additional thresholds, at which point decision 430 branches to the 'no' branch exiting the loop. The process determines as to whether there are more apps installed on the device to select and process (decision 440). If there are more apps installed on the device to select and process, then decision 440 branches to the 'yes' branch which loops back to step 410 to select the next app on the device. This looping continues until are no more apps installed on the device to select and process, at which point decision 440 branches to the 'no' branch exiting the loop.

At step 450, the process selects the first default threshold. As the name implies, default thresholds and actions are taken on apps that were not specifically configured in steps 410 through 440. For example, an impact can be computed as the likelihood of the power outage occurring in the user's geographic area combined with the possible impact time span, such as number of hours or days the impact is likely to last. Using this impact example, the user might select a threshold of a fifty percent (50%) likelihood that the power outage lasts for three days, etc. At step 460, the user chooses default action to take for unselected apps if prediction of calamity exceeds selected threshold, such as automatically terminate the app, alert the user to terminate the app, or keep running the app on the mobile device. At step 465, the users chooses a device action to take if a calamity is predicted to exceed a selected threshold. Such device actions might include dimming the device's screen, entering a power save mode, powering off the device, turning off wireless communications (e.g., "airplane mode," etc., and the like.

The process determines as to whether the user wishes to set up additional default thresholds (decision 470). If more default thresholds are desired, then decision 470 branches to the 'yes' branch which loops back to step 450 to select and define the next default threshold. This looping continues until no more default thresholds are desired, at which point decision 470 branches to the 'no' branch exiting the loop. At step 480, the process saves selections and actions in device nonvolatile memory area 490. Configuration and setup processing performed by the steps shown in FIG. 4 thereafter ends at 495.

Figure 5:
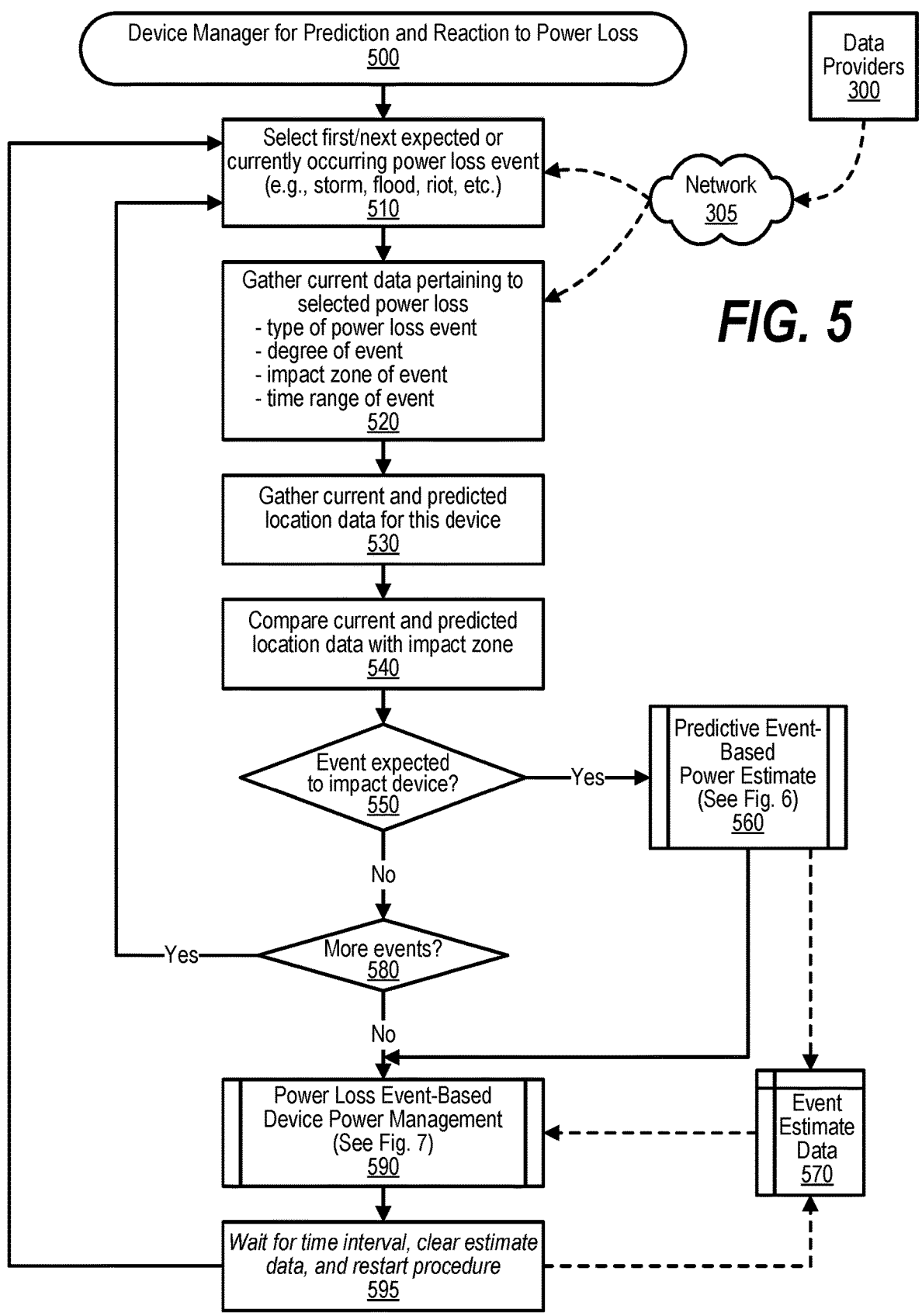
FIG. 5 is a flowchart showing steps taken by a device manager for prediction and reaction to power loss event.

FIG. 5 is a flowchart showing steps taken by a device manager for prediction and reaction to power outage. FIG. 5 processing commences at 500 and shows the steps taken by a device manager running on the user's mobile device that performs a routine for predicting and reacting to a predicted power outage. At step 510, the process selects the first expected or currently occurring power outage (e.g., due to a storm, flood, hurricane, riot, etc.). The power outage data is received via computer network 305, such as the Internet, and the power outage data is prepared by data providers 300 that transmit the data to the computer network.

At step 520, the process gathers the current, or most up-to-date, data pertaining to the selected power outage that is either occurring or is predicted to occur. This data includes the type of calamity (e.g., hurricane, flood, storm, tornado, etc.), the degree of calamity (e.g., major hurricane, minor flooding, etc.), the impact zone of the calamity (e.g., expected geographic areas that will be impacted by the power outage, etc.), and the time range of calamity (e.g., for the next seven days for a major hurricane, for two days for a severe storm, etc.).

At step 530, the process gathers current and predicted location data for this device. Current location, or geographic, data for the user's mobile device is obtained using a GPS module in the device or a similar type of module that obtains the geographic data through other means, such as triangulation using mobile telephone network towers, etc. Predicted location data is gathered by analyzing data stored on the device and maintained by the user, such as the user's upcoming travel itineraries, etc. For example, the user may have an entry indicating that the user plans to drive from Chicago to Denver in two days. In this example, an event is expected to affect Denver in two or three days might impact the user.

At step 540, the process compares the device's current and predicted location data with the anticipated impact zone of the selected power loss event. The process determines as to whether the user's mobile device, and therefore the user, is likely to be in the anticipated impact zone during the anticipated time range of the selected power loss event (decision 550). If the user's mobile device, and therefore the user, is likely to be in the anticipated impact zone during the anticipated time range of the selected power loss event, then decision 550 branches to the 'yes' branch whereupon predefined process 560 is performed. At predefined process 560, the process performs the Predictive Calamity-Based Power Estimate routine (see FIG. 6 and corresponding text for processing details). Data generated by predefined process 560 is stored in calamity estimate data memory area 570.

On the other hand, if the user's mobile device is not expected to be in the anticipated impact zone during the anticipated time range of the selected power loss event, then decision 550 branches to the 'no' branch bypassing predefined process 560. The process determines as to whether there are more natural calamities to process (decision 580). If there are more natural calamities to process, then decision 580 branches to the 'yes' branch which loops back to step 510 to select and process the next power loss event as described above. This looping continues until there are no more natural calamities to process, at which point decision 580 branches to the 'no' branch exiting the loop.

Figure 7:
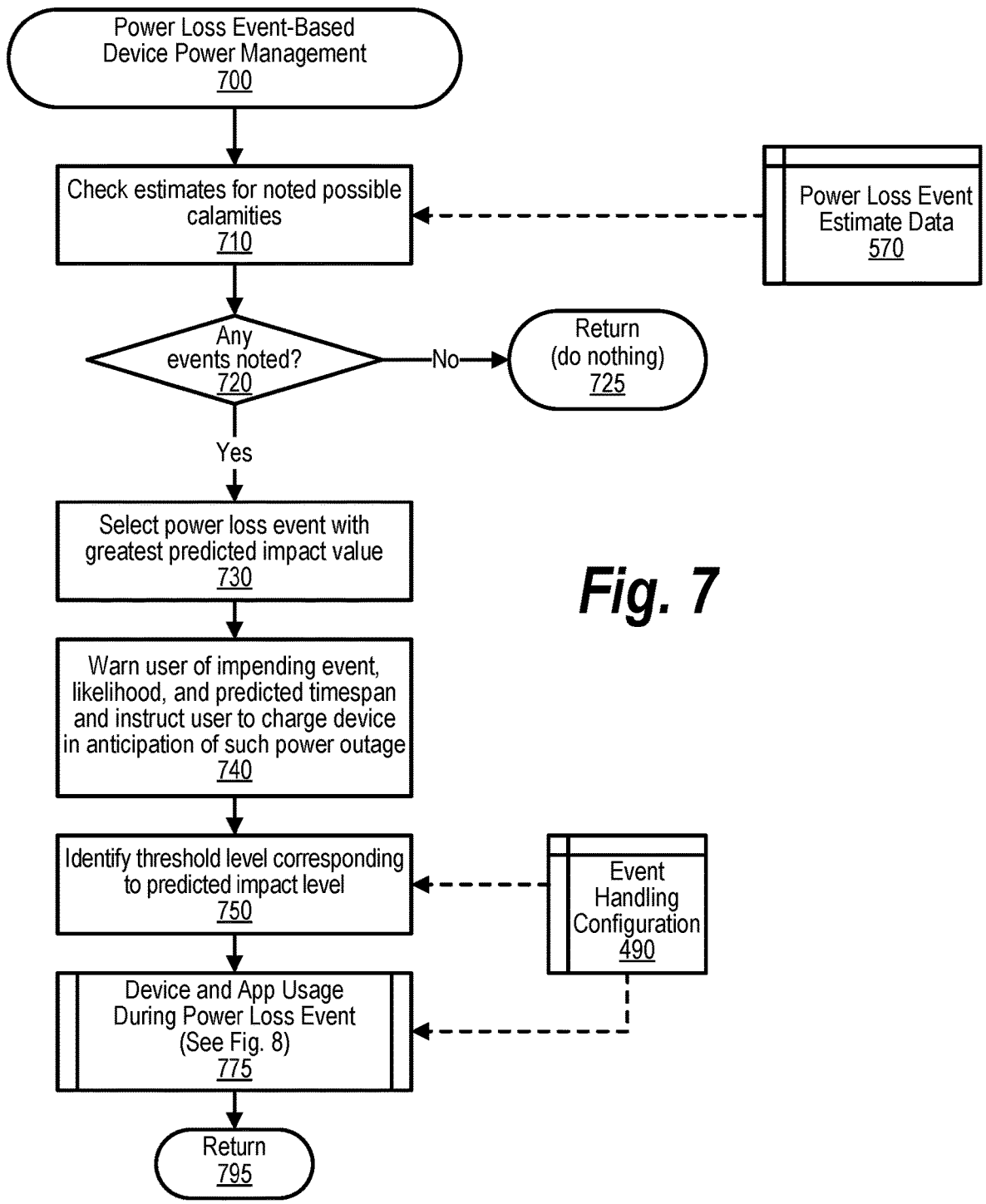
FIG. 7 is a flowchart showing steps that perform a calamity-based device power management routine.

At predefined process 590, the process performs the Calamity-Based Device Power Management routine (see FIG. 7 and corresponding text for processing details). Predefined process 590 utilizes calamity estimate data stored in memory area 570 to perform the calamity-based device power management routine. At step 595, the process waits for a time interval to elapse (e.g., ten minutes, etc.) before re-executing the routine shown in FIG. 5. When the time interval has elapsed, the process clears the estimate data from memory area 570, and restarts procedure by looping back to step 510.

Figure 6:
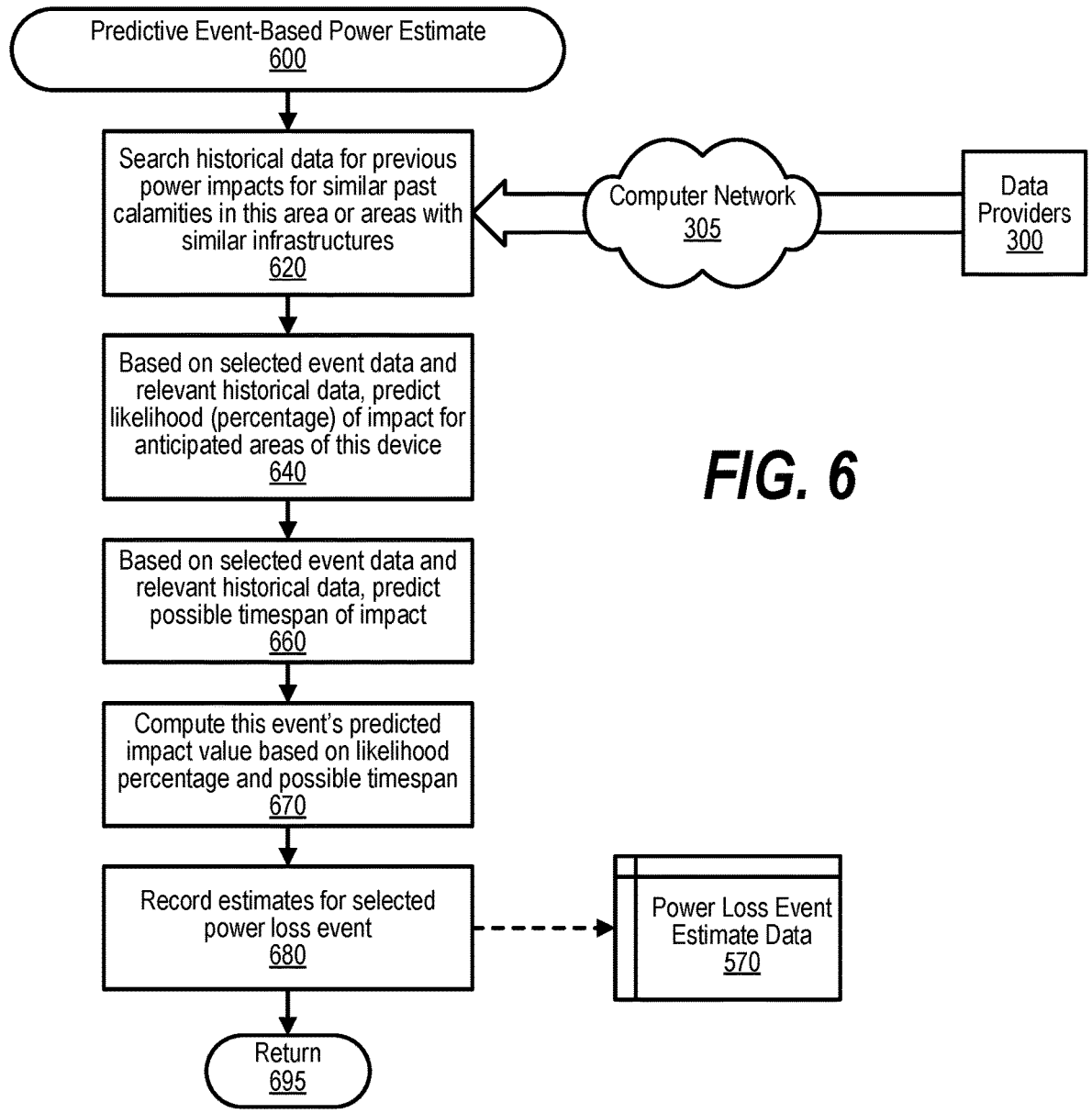
FIG. 6 is a flowchart showing steps that perform a predictive calamity-based power estimate.

FIG. 6 is a flowchart showing steps that perform a predictive calamity-based power estimate. FIG. 6 processing commences at 600 and shows the steps taken by a process that gathers predictive calamity-based power estimate data. At step 620, the process searches historical data for previous power impacts for similar past calamities in this area or areas with similar infrastructures. The historical data is provided by data providers 300 (e.g., archive data maintained by data providers, etc.) which is transmitted via computer network 305, such as the Internet, and received by the mobile device.

At step 640, the process predicts a likelihood (e.g., percentage, etc.) of impact for the anticipated areas of this mobile device based on the selected calamity data and relevant historical data gathered in step 620. At step 660, the process predicts a possible, or estimated, time span of impact of the power loss event based on the selected calamity data and relevant historical data gathered in step 620.

At step 670, the process computes this power loss event's predicted impact value based on the likelihood percentage and the possible time span. At step 680, the process records data pertaining to the power loss event in memory area 570. As shown, the data maintained for a power loss event includes the likelihood of the power loss event affecting the user's geographic area, the expected time span of the power loss event, and the anticipated impact value of the power loss event that was computed in step 670. FIG. 6 processing thereafter returns to the calling routine (see FIG. 5) at 695.

FIG. 7 is a flowchart showing steps that perform a calamity-based device power management routine. FIG. 7 processing commences at 700 and shows the steps taken by a process that performs calamity-based device power management at the user's mobile device. At step 710, the process checks power loss event estimate data for noted possible calamities that are anticipated to affect the user's current or anticipated locations. The power loss event estimate data is retrieved from memory area 570 and was gathered using the routine shown in FIG. 6.

The process determines as to whether any calamities were found in the power loss event estimate data that are expected to impact the user (decision 720). If any calamities were found in the power loss event estimate data that are expected to impact the user, then decision 720 branches to the 'yes' branch to process the data. On the other hand, if no calamities were found in the power loss event estimate data that are expected to impact the user, then decision 720 branches to the 'no' branch whereupon processing returns to the calling routine (see FIG. 5) at 725 without performing any device power management functions.

At step 730, the process selects the power loss event with greatest predicted impact value. At step 740, the process warns user of the impending power loss event, as well as the likelihood that the power loss event will affect the user, and the predicted time span of the power loss event. The process further instructs the user to charge the user's mobile device in anticipation of a power outage based on the anticipated power loss event.

At step 750, the process identifies the threshold level corresponding to the predicted impact value by retrieving threshold data from configuration memory area 490. At predefined process 775, the process performs the Device and App Usage During Power Loss Event routine (see FIG. 8 and corresponding text for processing details). Predefined process 775 utilizes configuration data retrieved from memory area 490 to determine the usage actions to take at the device. FIG. 7 processing thereafter returns to the calling routine (see FIG. 5) at 795.

Figure 8:
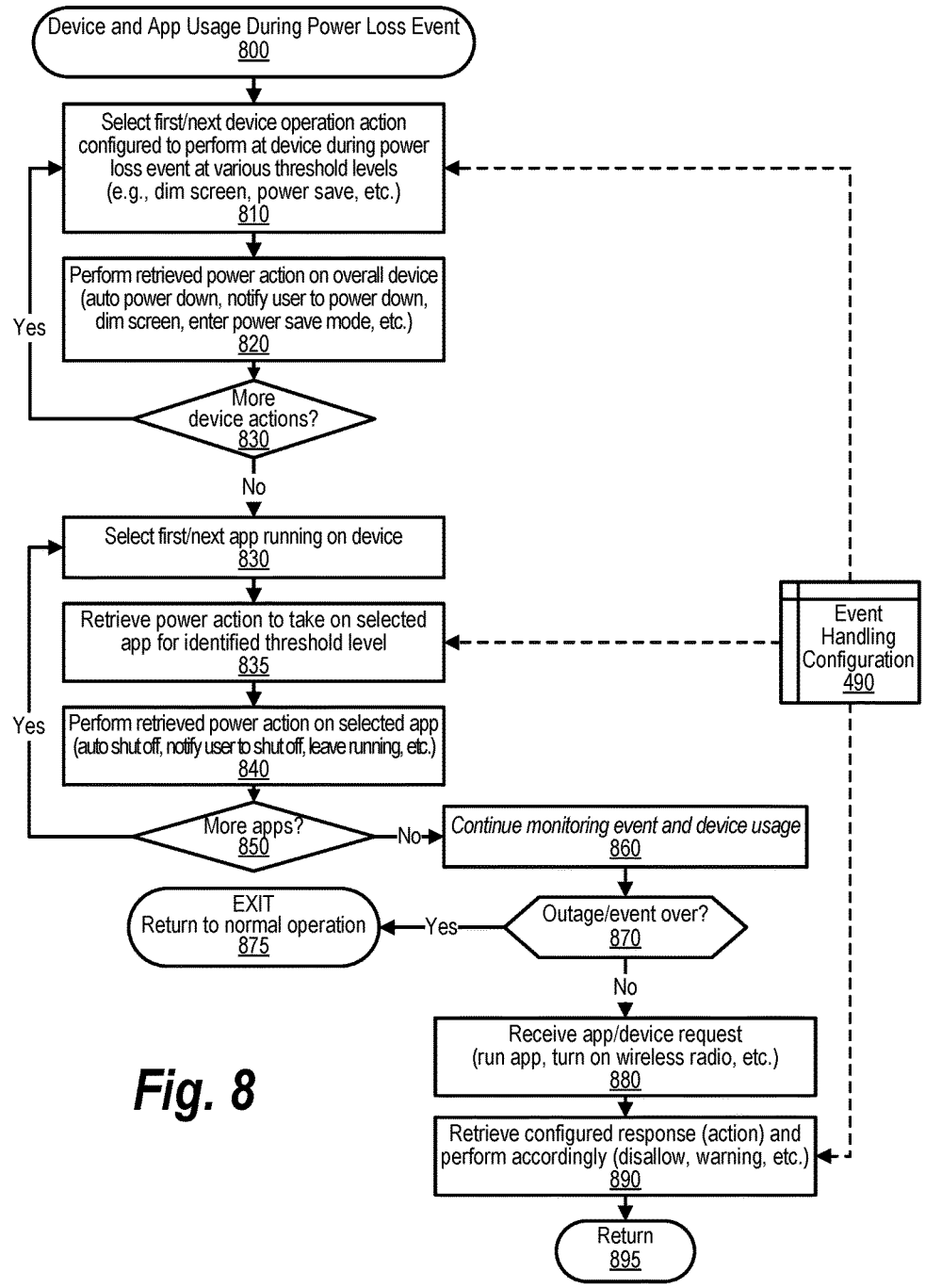
FIG. 8 is a flowchart showing steps that handle device and app usage during a power outage event.

FIG. 8 is a flowchart showing steps that handle device and app usage during a power outage event. FIG. 8 processing commences at 800 and shows the steps taken by a process that handles device and app usage on the device during a power loss event. At step 810, the process selects the first power action configured to perform at device during a power loss event at various threshold levels. These actions might be to dim the device screen, power down the device, enter a power saving mode, turn off wireless communications (e.g., "airplane mode," etc.), and the like. At step 820, the process performs the retrieved power action on the overall device. If the action is to power down the device then the device is powered down, if the action is to dim the screen then a dimmer screen setting is applied to the brightness level of the screen, if a power saving mode is selected, then such power saving mode is invoke, if the action is to turn off wireless communications then the device enters "airplane mode" and powers off wireless communications, etc. The process determines as to whether there are more device actions to take on the overall device (decision 825). If there are more device actions to take on the overall device, then decision 825 branches to the 'yes' branch which loops back to step 810 to select and process the next power action configured for the overall device. This looping continues until there are no more device actions to take on the overall device, at which point decision 825 branches to the 'no' branch exiting the loop. At step 830, the process selects the first app running on device. At step 835, the process retrieves a power action to take on selected app for the identified threshold level. At step 840, the process performs the retrieved power action on the selected app (e.g., automatically terminate the app, notify the user to terminate the app, keep the app running, etc.). The process determines as to whether there are more apps to process (decision 850). If there are more apps to process, then decision 850 branches to the 'yes' branch which loops back to step 830 to select and process the next app running on the device. This looping continues until there are no more apps to process, at which point decision 850 branches to the 'no' branch exiting the loop.

At step 860, the process continues monitoring the power loss event and also continues to monitor usage of the device by the user. The process determines as to whether the power loss event has terminated and power has been restored (decision 870). If the power loss event has terminated and power has been restored, then decision 870 branches to the 'yes' branch whereupon, at 875, the power loss event actions shown in FIGS. 3-8 are terminated until such time as another power loss event occurs. On the other hand, if the power loss event is still ongoing, then decision 870 branches to the 'no' branch for further processing. At step 880, the process receives an app or device request at the device from a user of the device. The request might be to execute a particular app (e.g., a game, a weather radio app, turn on the device's wireless radio, etc.). At step 890, the process retrieves the response, or action, that was configured and performs the action accordingly. For example, the execution of the game might be prohibited and disallowed while the power loss event is ongoing, while the user might be allowed to turn on the wireless radio for emergency communications while the power loss event is ongoing. This received action is performed at the device to either disallow or allow the requested action at the device. In addition, the action might include a warning that a power loss event is currently ongoing and that use of the device should be limited in order to preserve battery power. FIG. 8 processing thereafter returns to the calling routine (see FIG. 7) at 895.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   predicting a power loss event corresponding to a calamity;
   identifying a predicted geographic location of a mobile battery powered device that is moving from a current geographic location to the predicted geographic location;
   gathering a set of current data pertaining to the calamity, wherein the current data includes a predicted geographic impact zone of the power loss event;
   comparing the predicted geographic impact zone to the predicted geographic location of the mobile battery powered device;
   identifying one or more power saving actions to perform at the mobile battery powered device based on the comparison; and
   performing the identified power saving actions at the mobile battery powered device.

2. The method of claim 1 further comprising:
   identifying a predicted power loss timespan of the predicted power loss event;
   receiving a user request corresponding to an application installed on the battery powered device;
   determining whether to allow usage of the application based on the comparison of the predicted geographic impact zone to the predicted geographic location of the mobile battery powered device and the predicted power loss timespan; and
   selectively allowing execution of the application based on the determination.

3. The method of claim 1 wherein at least one of the actions is a device operation action.

4. The method of claim 3 further comprising:
   comparing the predicted power loss event to one or more thresholds; and
   selecting the device operation action based on the comparison.

5. The method of claim 1 further comprising:
   notifying a user of the battery powered device of the predicted power loss event, wherein the notifying includes a request to charge the mobile device based on a a next predicted recharge time.

6. The method of claim 1 further comprising:
   retaining a normal set of device settings prior to performing the power saving actions;
   determining that the predicted power loss event has ended; and
   restoring the normal set of device settings to the battery powered device in response to the determination.

7. The method of claim 1 further comprising:
   comparing the set of current data pertaining to the calamity to one or more previous sets of data pertaining to previous similar calamities; and
   predicting the power loss event and a predicted timespan of the power loss event based on the comparison.

8. An information handling system comprising:
   one or more processors;
   a memory coupled to at least one of the processors;
   a battery that supplies power to the processors, the memory; and
   a set of instructions stored in the memory and executed by at least one of the processors to:
   predict a power loss event corresponding to a calamity;
   identify a predicted geographic location of a mobile battery powered device that is moving from a current geographic location to the predicted geographic location;
   gather a set of current data pertaining to the calamity, wherein the current data includes a predicted geographic impact zone of the power loss event;
   compare the predicted geographic impact zone to the predicted geographic location of the mobile battery powered device;
   identify one or more power saving actions to perform at the mobile battery powered device based on the comparison; and
   perform the identified power saving actions at the mobile battery powered device.

9. The information handling system of claim 8 further comprising additional instructions that are executed by at least one of the processors to:
   identify a predicted power loss timespan of the predicted power loss event;
   receive a user request corresponding to an application installed on the battery powered device;
   determine whether to allow usage of the application based on the comparison of the predicted geographic impact zone to the predicted geographic location of the mobile battery powered device and the predicted power loss timespan; and
   selectively allow execution of the application based on the determination.

10. The information handling system of claim 8 wherein at least one of the actions is a device operation action.

11. The information handling system of claim 10 further comprising additional instructions that are executed by at least one of the processors to:
   compare the predicted power loss event to one or more thresholds; and
   select the device operation action based on the comparison.

12. The information handling system of claim 8 further comprising additional instructions that are executed by at least one of the processors to:
   notify a user of the battery powered device of the predicted power loss event, wherein the notifying includes a request to charge the mobile device based on a a next predicted recharge time.

13. The information handling system of claim 8 further comprising additional instructions that are executed by at least one of the processors to:
   retain a normal set of device settings prior to performance of the power saving actions;
   determine that the predicted power loss event has ended; and
   restore the normal set of device settings to the battery powered device in response to the determination.

14. The information handling system of claim 8 further comprising additional instructions that are executed by at least one of the processors to:
   compare the set of current data pertaining to the calamity to one or more previous sets of data pertaining to previous similar calamities; and
   predict the power loss event and a predicted timespan of the power loss event based on the comparison.

15. A computer program product comprising:
   a computer readable storage medium comprising a set of computer instructions, the computer instructions effective to:
      predict a power loss event corresponding to a calamity;
      identify a predicted geographic location of a mobile battery powered device that is moving from a current geographic location to the predicted geographic location;
      gather a set of current data pertaining to the calamity, wherein the current data includes a predicted geographic impact zone of the power loss event;
      compare the predicted geographic impact zone to the predicted geographic location of the mobile battery powered device;
      identify one or more power saving actions to perform at the mobile battery powered device based on the comparison; and
      perform the identified power saving actions at the mobile battery powered device.

16. The computer program product of claim 15 further comprising additional instructions effective to:
   identify a predicted power loss timespan of the predicted power loss event;
   receive a user request corresponding to an application installed on the battery powered device;
   determine whether to allow usage of the application based on the comparison of the predicted geographic impact zone to the predicted geographic location of the mobile battery powered device and the predicted power loss timespan; and
   selectively allow execution of the application based on the determination.

17. The computer program product of claim 15 wherein at least one of the actions is a device operation action.

18. The computer program product of claim 17 further comprising additional computer instructions effective to:
   compare the predicted power loss event to one or more thresholds; and
   select the device operation action based on the comparison.

19. The computer program product of claim 15 further comprising additional computer instructions effective to:
   notify a user of the battery powered device of the predicted power loss event, wherein the notifying includes a request to charge the mobile device based on a a next predicted recharge time.

20. The computer program product of claim 15 further comprising additional instructions effective to:
   compare the set of current data pertaining to the calamity to one or more previous sets of data pertaining to previous similar calamities; and
   predict the power loss event and a predicted timespan of the power loss event based on the comparison.

* * * * *